(12) United States Patent
Kips et al.

(10) Patent No.: US 9,419,880 B2
(45) Date of Patent: Aug. 16, 2016

(54) METHOD AND SYSTEM FOR HANDLING SERVICE REQUESTS IN A TELECOMMUNICATIONS NETWORK

(75) Inventors: Annemieke Kips, Leiden (NL); Johannes Maria van Loon, Zoetermeer (NL)

(73) Assignees: Koninklijke KPN N.V., The Hague (NL); Nederlandse Organisatie voor Toegepast-Natuurwetenschappelijk Onderzoek TNO, Delft (NL)

(*) Notice: Subject to any disclaimer, the term of this patent is extended or adjusted under 35 U.S.C. 154(b) by 193 days.

(21) Appl. No.: 13/993,749

(22) PCT Filed: Dec. 21, 2011

(86) PCT No.: PCT/EP2011/073694
§ 371 (c)(1),
(2), (4) Date: Jun. 13, 2013

(87) PCT Pub. No.: WO2012/085158
PCT Pub. Date: Jun. 28, 2012

(65) Prior Publication Data
US 2013/0268665 A1   Oct. 10, 2013

(30) Foreign Application Priority Data
Dec. 21, 2010   (EP) .................................. 10196128

(51) Int. Cl.
G06F 15/16    (2006.01)
H04L 12/26   (2006.01)
H04M 3/42    (2006.01)

(52) U.S. Cl.
CPC ............. *H04L 43/0876* (2013.01); *H04M 3/42* (2013.01); *H04M 2203/205* (2013.01)

(58) Field of Classification Search
CPC .................................................. H04L 43/0876

USPC .................... 709/224, 226, 228, 203, 227
See application file for complete search history.

(56) References Cited

U.S. PATENT DOCUMENTS 6,049,603 A     4/2000   Schwartz et al.
6,952,422 B2 *  10/2005  Yamaguchi ................. 370/401
(Continued)

FOREIGN PATENT DOCUMENTS

CA    2248658      3/1999
CN    101960886 A  1/2011
(Continued)

OTHER PUBLICATIONS

"FIFO Networking: Punctual Event-Triggered Communication"—Viktor Leijon, Lulea University of Technology, Oct. 2009 https://pure.ltu.se/portal/files/3092999/MF-000361.pdf.*
(Continued)

*Primary Examiner* — Randy Scott
(74) *Attorney, Agent, or Firm* — McDonnell Boehnen Hulbert & Berghoff LLP

(57) ABSTRACT

One aspect of the disclosure relates to a method for handling a service request from a requesting entity in a telecommunications network. A first service request for a particular service is received from the requesting entity. A sequence identifier is assigned to the requesting entity from which the first service request is received. The first service request is rejected by sending a reject message to the requesting entity and the assigned sequence identifier is also communicated to the requesting entity. At some later time, the sequence identifier is transmitted (e.g. broadcasted) in the telecommunications network in order. A second service request for the particular service is then received from the requesting entity and the serving entity now allows the request for the service.

22 Claims, 5 Drawing Sheets

(56) References Cited

U.S. PATENT DOCUMENTS

| | | | | |
|---|---|---|---|---|
| 8,280,948 | B1* | 10/2012 | Chen | H04N 21/4402 709/203 |
| 2005/0003765 | A1 | 1/2005 | Alfano et al. | |
| 2008/0060064 | A1* | 3/2008 | Wynn | H04L 63/062 726/5 |
| 2008/0082761 | A1* | 4/2008 | Herness et al. | 711/152 |
| 2011/0231478 | A1* | 9/2011 | Wheeler et al. | 709/203 |

FOREIGN PATENT DOCUMENTS

| | | |
|---|---|---|
| EP | 0 905 957 A2 | 3/1999 |
| EP | 1006705 A1 | 6/2000 |
| EP | 2096884 A1 | 9/2009 |
| GB | 2460630 A | 12/2009 |
| JP | 05-316562 | 11/1993 |
| JP | 10-028284 | 1/1998 |
| JP | 10-191455 | 7/1998 |
| JP | 11-252650 | 9/1999 |
| JP | 2006-513644 A | 4/2006 |
| WO | 2004/066564 A1 | 8/2004 |

OTHER PUBLICATIONS

PCT International Search Report and Written Opinion, PCT International Application No. PCT/EP2011/073694 dated Apr. 11, 2012.

"3rd Generation Partnership Project: Technical Specification Group Services and System Aspects; Service Requirements for Machine-Type Communications (MTC); Stage 1 (Release 10)", 3GPP TS 22.368, V10.2.0, Sep. 2010, pp. 1-22.

"3rd Generation Partnership Project: Technical Specification Group Services and System Aspects; Network Architecture (Release 9)", 3GPP TS 23.002, V9.5.0, Dec. 2010, pp. 1-94.

"3rd Generation Partnership Project: Technical Specification Group Services and System Aspects; General Packet Radio Service (GPRS) Enhancements for Evolved Universal Terrestrial Radio Access Network (E-UTRAN) Access (Release 10)", 3GPP TS 23.401, V10.1.0, Sep. 2010, pp. 1-271.

Translation of Korean Patent Application Office Action, Korean Patent Application Serial No. 10-2013-7014959 dated Jun. 11, 2014.

Translated First Office Action, Chinese Patent Application No. 2011800617665, dated Oct. 10, 2014, 7 pages.

Translated Notice of Reasons for Rejection, Japanese Application No. 2013-545387, dated May 30, 2014, 4 pages.

* cited by examiner

METHOD AND SYSTEM FOR HANDLING SERVICE REQUESTS IN A TELECOMMUNICATIONS NETWORK

CROSS REFERENCE TO RELATED APPLICATIONS

The present application is a national stage entry of PCT/EP2011/073694, filed Dec. 21, 2011, and claims priority to EP 10196128.2, filed Dec. 21, 2010. The full disclosures of EP 10196128.2 and PCT/EP2011/073694 are incorporated herein by reference.

FIELD OF THE INVENTION

The invention generally relates to the field of telecommunications. More specifically, the invention relates to handling service requests in a telecommunications network.

BACKGROUND OF THE INVENTION

Telecommunications networks that provide wireless access (e.g. GSM, UMTS, WiMax, LTE) have developed tremendously over the past years. In such networks, voice and data services can be provided to communication devices having a high mobility, i.e. the communication devices are not bound to a particular location and are freely movable through the area covered by the network. A gateway node of the telecommunications network enables connection to a further network, for example a network based on IP such as the internet.

One particular example of usage of telecommunications networks involves services relating to so-called machine-to-machine (M2M) communications, also referred to as machine-type communications (MTC). M2M is currently being standardized in 3GPP (see e.g. TS 22.368). MTC applications typically involve hundreds, thousands or millions of communication devices which each act as a communication devices to the telecommunication network. Such communication devices may be stationary or non-stationary. An example involves the electronic reading of e.g. 'smart' electricity meters at the homes of a large customer base over the telecommunications network from a server connected to the further network. Other examples include sensors, meters, vending or coffee machines, car meters for route pricing applications, navigation equipment etc. that can be equipped with communication modules that allow exchanging information with other equipment, such as a data processing centre over the telecommunications network. Such devices may also be monitored by the data processing centre. The data processing centre may e.g. store the data and/or provide a schedule for maintenance people to repair or refill a machine, meter or sensor or may update information in the device. Also, the data processing centre may be configured for processing data received from mobile communications devices, e.g. for road pricing applications.

Generally, in cases of potentially many coincident requests from devices to a network, some form of control of the use of network resources is desired. As an example, many mobile devices are nowadays able to retrieve e-mail messages from a network. Lots of devices may be programmed to retrieve e-mail messages exactly at the same moment in time, many times a day. In fact mostly there is no need for these devices or applications to have their requests handled immediately. It is the nature of the application that issues the service requests at the same point in time.

In telecommunications network, data is usually temporarily buffered when immediate processing is not possible. However, if due to congestion a network element is not capable to handle (grant or reject) service requests within a certain time frame, keeping these requests pending is not an option. Mostly these types of procedures are using time-out mechanisms and if no response is received the request procedure will be aborted and most probably a new request will be generated. This again will cause an extra load on the already overloaded network element and possibly on other network elements involved in handling the request.

In the example of M2M applications, EP 2 096 884 discloses specifying one or more time intervals in the telecommunications network during which a particular communication device or group of communication devices is allowed to access the network in order to enable a network operator to control the use of network resources. Access requests to the network outside the specified time intervals are denied.

Whereas this approach enables the network operator to provide e.g. certain access grant time intervals to specific groups of customer devices during which access to the network may be granted, the sending of access requests is still at the discretion of the customer or device and can not be controlled from the network.

Therefore, there exists a need in the art for improved control of network resources by a network operator.

SUMMARY OF THE INVENTION

One aspect of the invention relates to a method for handling a service request from a requesting entity in a telecommunications network. A first service request for a particular service is received from the requesting entity. A sequence identifier is assigned to the requesting entity or to the service request of the requesting entity from which the first service request is received. The first service request is rejected by sending a reject message to the requesting entity and the assigned sequence identifier is also communicated to the requesting entity. At some later time, an indication of the sequence identifier is transmitted (e.g. broadcasted) in the telecommunications network in order. A second service request is then received from the requesting entity and the serving entity now allows the request for the service.

A further aspect of the invention relates to a serving entity configured for handling a service request in a telecommunications network. The serving entity is configured for receiving, from the requesting entity, a first service request requesting a particular service from a serving entity. A sequence identifier is assigned by the serving entity to the requesting entity or to the request of the requesting entity from which the first service request is received. The serving entity is configured to reject the first service request by sending a reject message to the requesting entity. The serving entity is also configured to communicate the assigned sequence identifier to the requesting entity. The serving entity is configured to transmit, at some later time, an indication of the sequence identifier in the telecommunications network. The serving entity is configured to receive a second service request from the requesting entity in response to transmitting the indication of the sequence identifier in the telecommunications network to now allow the second service request received from the requesting entity.

Still another aspect of the invention relates to a method for requesting a service from a serving entity in a telecommunications network. A first service request for a particular service is transmitted from a requesting entity. This first service request is rejected. A sequence identifier, assigned to the requesting entity or to the service request of the requesting entity is also communicated to the requesting entity and stored. At some time after storing the sequence identifier, an indication of the sequence identifier is received by the requesting entity, triggering transmission of a second service request from the requesting entity to the telecommunications network. The telecommunications network now allows the service request and the requested service can be used.

Yet another aspect of the invention relates to a requesting entity, for example a terminal, configured for requesting a service for a particular service from a serving entity in a telecommunications network. The requesting entity is configured for transmitting a first service request for a particular service to the telecommunications network. The requesting entity is configured for receiving a reject message in response to transmitting the first service request. Moreover, an indication of a sequence identifier assigned to the requesting entity or to the request of the requesting entity is received and stored in the requesting entity. At some time after storing the sequence identifier, the requesting entity receives an indication of the sequence identifier and transmits a second service request for a particular service to the telecommunications network that is now allowed.

The above-described aspects enable the telecommunications network to announce when a service request from one or more particular requesting entities can be allowed by transmitting (e.g. broadcasting) an indication of one or more sequence identifiers in the telecommunications network that have previously been assigned to the corresponding requesting entities or to the requests of the requesting entities. In doing so, a sequence of requesting entities can be allowed by the network to transmit the second service request facilitating improved control by the telecommunications network over the transmission of service requests from the requesting entities. The requesting entities for which the first service request has been rejected and that are not yet allowed a second service request find themselves waiting for their turn. These requesting entities can be said to be waiting in a virtual queue.

As used herein, the term sequence identifier relates to an identifier enabling the telecommunications network (in particular, the serving entity) to determine the sequence in which the requesting entities can be allowed to transmit the second service request. It is not precluded that a same sequence identifier is assigned to multiple requesting entities or to multiple requests of a same or of different requesting entities.

As used herein, the term indication of a sequence identifier relates to indicating one or more sequence identifiers using a same or a different representation (e.g. coding, representation, etc.) as a sequence identifier communicated to and stored by a requesting entity. Thus, a particular indication of a sequence identifier may correspond to only a single sequence identifier, to an explicitly specified range of sequence identifiers, to an implicitly specified range of sequence identifiers, and even to all sequence identifiers. Receiving an indication of a sequence identifier at some time after storing the sequence identifier enables a requesting entity (e.g. a terminal) to determine if the sequence identifier stored in the requesting entity is in the scope of the received indication of a sequence identifier, and when to transmit a second service request to the telecommunications network that is likely to be allowed.

It should be noted that the sequence identifiers may be assigned in relation to the order wherein the first service requests are received and that the indications of the sequence identifier are also transmitted in that order to allow (to trigger) second service requests. In this manner, a first-come, first-served approach is established. However, sequence identifiers can also be assigned and/or indications of a sequence identifier can also be transmitted on a different basis, e.g. to give priority to particular service requests (e.g. emergency requests) and/or to allow a certain batch of requesting entities to transmit a second request and/or to assign sequence identifiers with a pseudo-random component (for example, in case many service requests are received quasi simultaneously, to realise a more fair distribution of waiting times over the requesting entities). It should also be noted that assigning sequence numbers in a particular order does not preclude to occasionally and/or regularly skip in or more sequence numbers in the ordered sequence. Leaving some sequence numbers in a particular sequence unassigned allows to later assign an as yet unassigned number to a requesting entity, in order to provide the requesting entity with a more advantageous position in the virtual queue than at the end of the virtual queue.

It is expected to be common that the second service request transmitted by a requesting entity is a request for a same particular service as requested by the first service request. It is, however, not precluded that a requesting entity's second service request is for a different service. For example, in case it is desired to control service requests for more than a single service (e.g. for all services), the reject message may also indicate that the assigned sequence identifier relates to more services than to only the service requested with the first service request message.

It should be noted that the requesting entity may be a terminal (e.g. a MS, a UE or an M2M terminal) requesting a service to a network element (e.g. an MSC, a SGSN, an MME etc) but may also comprise a network element requesting a service to another network element (e.g. an SGSN requesting a service to a GGSN in a UMTS core network).

The telecommunications network may or may not include a wireless access network.

In one embodiment, the telecommunications network only employs the above method when congestion is detected in the network, resulting e.g. from a peak in the number of received (first) requests. The first requests may be rejected quickly and sequence identifiers can be assigned for applying the above-described method. Various types of congestions have been envisaged, including but not limited to congestion due to an overload of service requests in an MSC, a SGSN, an MME, a HLR, a GGSN etc. One particular form of congestion may e.g. be Access Point Name (APN) congestion.

In one embodiment, the requesting entity receives the assigned sequence identifier in the reject message. This provides for an efficient and fast manner of communicating the assigned sequence identifier to the requesting entity. In another embodiment, the requesting entity receives the assigned sequence identifier in a broadcast channel. In this case, multiple requesting entities listening to the same broadcast channel may be assigned a same sequence number.

The requesting entities may be informed that the serving entity is ready to accept their (second) service requests by broadcasting an indication of the sequence identifier(s) of the allowed (invited) requesting entities. Broadcasting may e.g. be performed using a cell broadcast centre broadcasting an indication of one or more sequence identifiers over one or more broadcasting channels or by using a broadcast control channel of a network element in the wireless access network. By listening to the broadcast (control) channel, the requesting entity can receive the indication of the sequence identifier and, if the sequence identifier stored in the requesting entity corresponds to or is otherwise in the scope of the received indication of the sequence identifier, be triggered to transmit the second service request. One way for the requesting entity to distinguish between receiving a sequence identifier for storing and receiving an indication of a sequence identifier for triggering transmitting the second service request is by detecting over which channel (e.g. signalling channel or broadcast (control) channel and/or which broadcast (control) channel) the sequence identifier is received.

The requesting entity transmitting the second service request may include the stored sequence identifier in the second service request in order to enable the serving entity to verify whether the sequence identifier assigned to the requesting entity corresponds to or is otherwise in the scope of the received indication of a sequence identifier. Only when correspondence is determined, the second service request is allowed.

In one embodiment, the requesting entity and the serving entity are configured for linking the sequence identifier received by the serving entity to the requesting entity to which the sequence identifier was assigned. In this manner, illegal use of a sequence identifier can be detected and to a large extent be avoided. The sequence identifier may e.g. be linked to an identifier of the requesting entity. Other approaches include sending a token to the requesting entity which value is linked to the sequence number or by encrypting either or both the sequence identifier and the indication of a sequence identifier while applying suitable algorithms in the serving entity and the requesting entity. Similar approaches may apply when different sequences apply for different services. When the assigned sequence identifier is service-specific, the sequence identifier may be linked to the particular service associated with the first service request in order to reduce the chance that a sequence identifier is used by a requesting entity that received the sequence identifier for a different service.

Various reasons may exist for the serving entity not receiving a second service request from the requesting entity even if this requesting entity was allowed (invited) to transmit the second service request. In order to avoid the serving entity to wait indefinitely, in one embodiment a timer may be started defining a time interval wherein the second service request from the requesting entity will be processed. After expiry of the timer, a further requesting entity can be allowed (invited) by e.g. broadcasting the indications of the sequence identifiers of one or more further requesting entities.

In one embodiment of the invention, more then one queue of requesting entities is defined. Sequence identifiers may now have a meaning only within a particular queue (and not in another queue). Multiple queues may prove advantageous to distinguish between different service requests (e.g. emergency, priority, groups of devices) or when multiple network elements may be congested (e.g. the HLR in case of attach procedures and/or the SGSN, GGSN and/or the HLR in case of a PDP Context setup procedures).

The telecommunications network not necessarily allows only one single requesting entity to transmit a second service request. It is not precluded that a particular sequence number is assigned to multiple requesting entities or to multiple requests of a same or of different requesting entities. Also, an indication of a plurality of sequence identifiers (e.g. an indication of a list and/or of an explicitly or implicitly defined range or even of all sequence identifiers) may be broadcast over the telecommunications network and all requesting entities having been assigned and received the corresponding sequence identifiers will have their second service requests processed.

One reason for a serving entity not to receive a second service request from a requesting entity although the entity in question was called, is that the requesting entity has moved and should now be served by a different serving entity. One example involves a mobile station moving through a wireless access network and being handed over to a cell served from a different, next SGSN. In that case, the requesting entity may detect the change regarding requesting services from a previous serving entity to a different, next serving entity and disregard the stored sequence number from the previous serving entity. Since the next SGSN may also be in congestion, the requesting entity may then receive a different, new sequence identifier and should wait until an indication of the new sequence identifier is received. The result of the change of serving entity is that the requesting entity is likely to have to wait for a longer time until the second service request can be transmitted (assuming, of course, that the next serving entity is also in congestion since, otherwise, the first service request to the next serving entity may be allowed). One way to avoid the requesting entity to be put back in the new queue is that the previous serving entity communicates sequence information (e.g. including a time stamp) to the next serving entity in order to allow the requesting entity to transmit a second service request to the next serving entity at an earlier point in time. To do so, the requesting entity may e.g. be assigned an as yet unused (e.g. purposely left free) sequence identifier. Alternatively, the requesting entity may be assigned a sequence identifier which is the same as a sequence identifier already assigned to a different requesting entity, in which case multiple requesting entities are assigned a same sequence number, thus sharing a place in the virtual queue.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
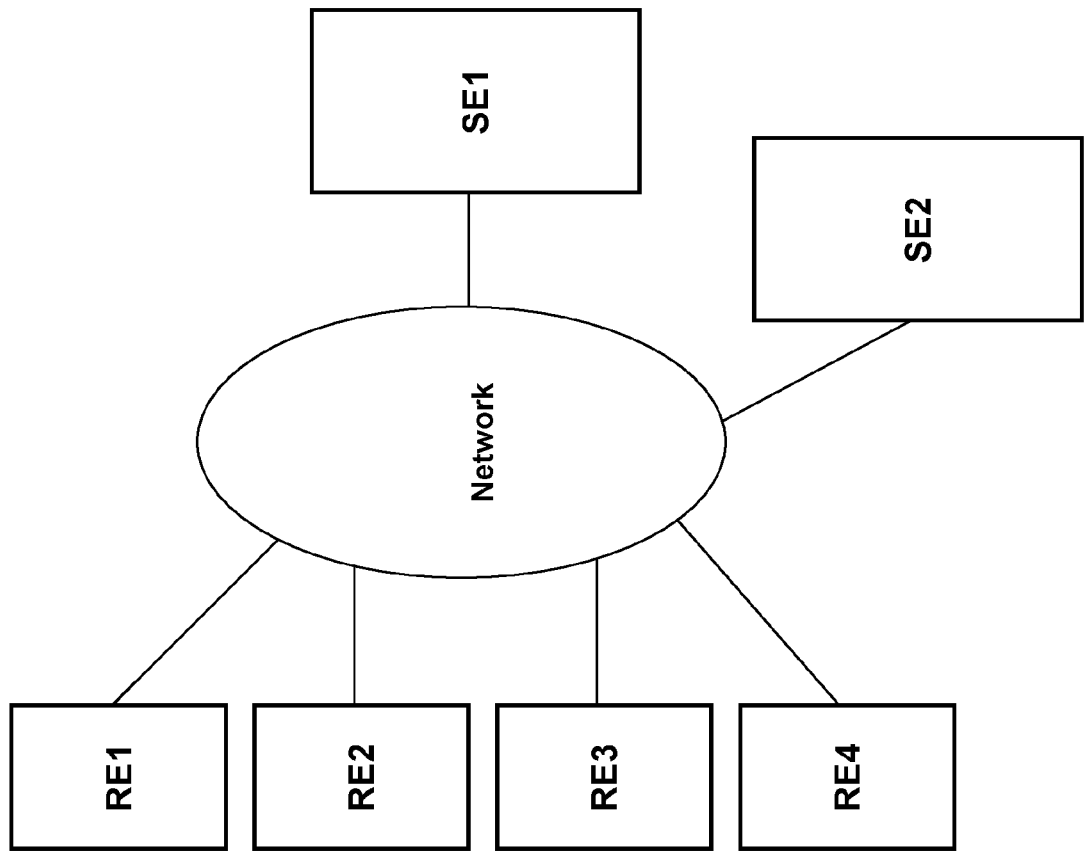
FIG. 1 is a schematic illustration of system comprising a serving entity and a plurality of requesting entities.

FIG. 1 is a schematic illustration of a system comprising a plurality of requesting entities RE. Examples of REs include terminals, such as mobile stations MS, user equipment UE or machine-type terminals for machine-to-machine type communications MTC. The REs may alternatively represent network elements, such as a base station BS, a (e)NodeB, a remote network controller RNC, a serving GPRS support node SGSN, a mobility management entity MME etc. The system also contains one or more serving entities SE. The SEs typically are network elements configured for providing services to requesting entities RE. It should be appreciated that network elements may act as requesting entities when these network elements request services from a serving entity as well as serving entities when these network elements receive service requests from a requesting entity. One example is an SGSN receiving an service attach request from a mobile station and sending a service request to a Gateway GPRS Support node GGSN.

It will be assumed in the remainder of the description that the requesting entities RE are terminals, while the serving entities are network elements. In the example of FIG. 1, the system includes requesting entities RE1, RE2, RE3 and RE4 (each of the requesting entities may itself represent a plurality of requesting entities) and two service entities SE1 and SE2 each providing the same service but in different coverage areas of a network. A connection between a requesting entity RE and a serving entity may either be (partly) wireless or wired.

Figure 2:
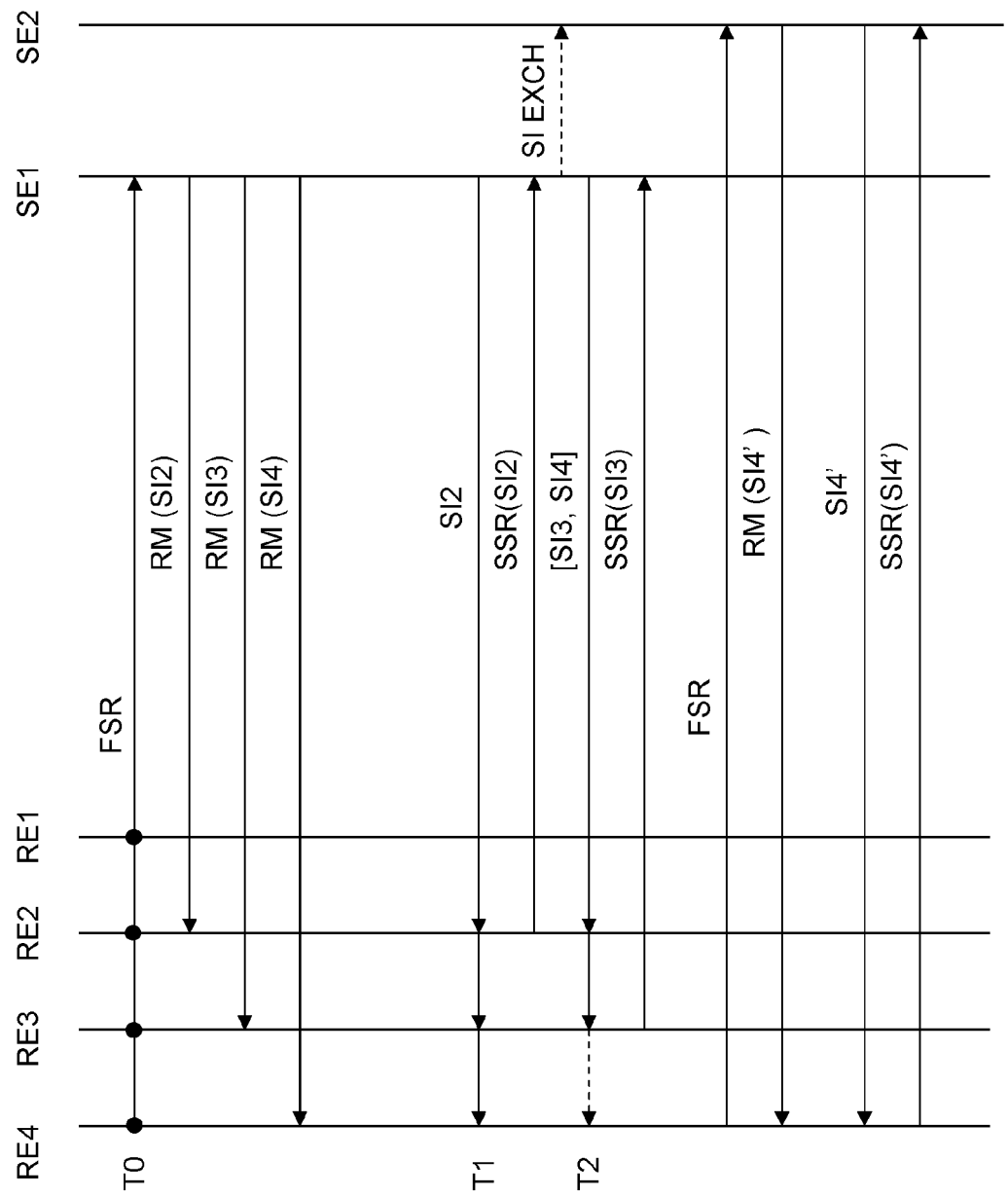
FIG. 2 is a schematic diagram illustrating basic steps for the operation of the system of FIG. 1

FIG. 2 depicts a simple time diagram of a data exchanges between the requesting entities RE and the serving entities SE. The vertical axis is the time axis.

At a particular moment in time T0, all requesting entities RE 1-4 transmit a first service request FSR to serving entity SE1 for providing a particular service. One example of a service request in a wireless access network involves an attach request, also referred to as a request for "registration" at the network. Another example of a service request in a wireless access network is a request to set up a connection in order to exchange data between the terminal and an further network connected to the wireless access network, e.g. the Internet or a corporate network. This is commonly referred to as a PDP Context set-up request.

Serving entity SE1 receiving the first service request may detect an overload of service requests and assume a request congestion mode. In this mode, serving entity SE1 may e.g. only allow a limited number of (first) service requests. In the example of FIG. 2, only the request of RE1 is allowed. The serving entity SE1 assigns sequence identifiers SI to the requesting entities for which the first service request cannot be allowed immediately. The first service requests of RE2, RE3 and RE4 are rejected and a sequence identifier SI2, SI3 and SI4 is transmitted in the reject message RM. The requesting entities RE are configured to not repeat the service request immediately, but to store the sequence identifier SI. Alternative to including the assigned sequence identifier in a reject message, it is also possible to transmit the sequence identifier on a broadcast channel. Then, a terminal, receiving a reject message and listening to the broadcast channel, may thus receive the assigned sequence identifier. In particular in the alternative a same sequence identifier may be assigned to multiple requesting entities. This may, of course, also be obtained when including the sequence identifier in the reject message by choosing a same sequence identifier value for e.g. SI3 and SI4.

At some time T1 after sending the reject messages RM, the service entity SE1 may detect that it can handle further service requests. The serving entity SE1 can now allow further requesting entity RE2 by transmitting an indication of sequence identifier SI2 to the requesting entity RE, e.g. via a broadcast channel. Requesting entity RE2 will find that the sequence identifier SE2 stored previously matches or is in the scope of the received indication of sequence identifier SE2. Consequently, the requesting entity RE2 will respond by transmitting a second service request SSR, e.g. for the particular service originally requested with the first service request FSR. The second service request SSR may contain also the stored sequence identifier SI2 to enable the serving entity SE1 to determine that the request is in response to the previous transmission of SI2 at T1 (and not a new request from a different requesting entity RE or from requesting entity RE2 but now for a different service). Requesting entities RE3 and RE4, although maybe receiving the same indication of sequence identifier SI2, via e.g. the broadcast channel, will not find a match with the stored sequence identifiers SI3, SI4, respectively, and therefore not transmit a second service request.

At some later point in time T2, the serving entity SE1 may again find that it is able to handle more service requests. SE1 now transmits an indication of a plurality of sequence identifiers SI to the requesting entities, depicted as [SI3,SI4] in FIG. 2. Requesting entity RE3 may again, as for RE2 described in the previous paragraph, respond by transmitting a second service request SSR(SI3).

At time T2, serving entity SE1 has also set a timer defining a time interval wherein the second service requests SSR of the invited requesting entities RE3, RE4 should be received in order to avoid that it waits indefinitely for these service requests. In the situation of FIG. 2, the timer of SE1 expires for the requesting entity RE4, resulting from the fact that RE4 is no longer within the service area of SE1. Therefore, RE4 did not receive the indication of sequence identifiers [SI3,SI4] at time T2, as indicated by the dashed arrow. However, also if RE4 would have received the indication of sequence identifiers [SI3,SI4] at T2, but would have waited too long, a second service request outside the time interval would be rejected by SE1 (assuming SE1's service request congestion situation persists) and a new sequence identifier may be assigned.

RE4 may detect that it is now in the coverage area of serving entity SE2 and therefore again transmits a first service request FSR towards SE2. Assuming SE2 is also in a service request congestion mode, SE2 assigns a sequence identifier SI4' and rejects the first service request FSR while communicating to RE4 the new sequence identifier SI4'. Again, this may be done by including it in the reject message or via a broadcast channel associated with SE2. Then, at some later time, the second serving entity SE2, by transmitting an indication of the sequence identifier SI4', e.g. via a broadcast channel associated with SE2. RE4 transmits a second service request SSR(SI4') towards SE2 that can now be allowed by SE2.

Alternatively or in addition to the above, when RE4's serving entity changed from SE1 to SE2, sequence information (e.g. timestamps associated with assigned sequence identifiers) may be exchanged between SE1 and SE2, as indicated by the arrow SI EXCH. This sequence information exchange may also result e.g. in SE2 assigning to RE4 a sequence identifier SE4' which corresponds to a queue position which is more favourable than at the end of SE2's virtual queue. This sequence information exchange may also result e.g. in that the first service request FSR of RE4 towards SE2 was immediately allowed by SE2 because the second serving entity SE2 was informed that RE4 already had been in a waiting queue for some time.

It should be appreciated that in the example of FIG. 2, it is assumed that the requesting entities RE were all placed in only a single queue. However, it may be that multiple queues are formed, each queue being identified e.g. by a queue identifier QI. In the case that more than one queue is used the sequence identifier, and similarly the indication of a sequence identifier, only has a meaning within a particular queue, i.e. $SI_Q$.

The need for or benefit of having more than one queue might be when a distinction is to be made between requests coming from different REs, e.g. emergency devices, devices having priority due to special access conditions e.g. willing to pay more or devices belonging to a certain group of devices e.g. a group of machine-to-machine devices. This distinction may be made on the basis of e.g. the Access Class assigned to the device and/or by a terminal identifier or subscription identifier.

Another reason for having more then one queue may be when a distinction is to be made between congestion in different network locations, e.g. HLR congestion, congestion in the SGSN, Access Point Name (APN) congestion, etc. In this case requests originating from different procedures are preferred to be handled differently and therefore separate queues may apply. As an example, attach requests and/or PDP context requests need to be postponed in case the HLR is in congestion, PDP Context setup requests to a particular APN need to be postponed in case an APN is in congestion, all requests to a particular SGSN may need to be postponed when the particular SGSN is in congestion, etc.

Figure 3:
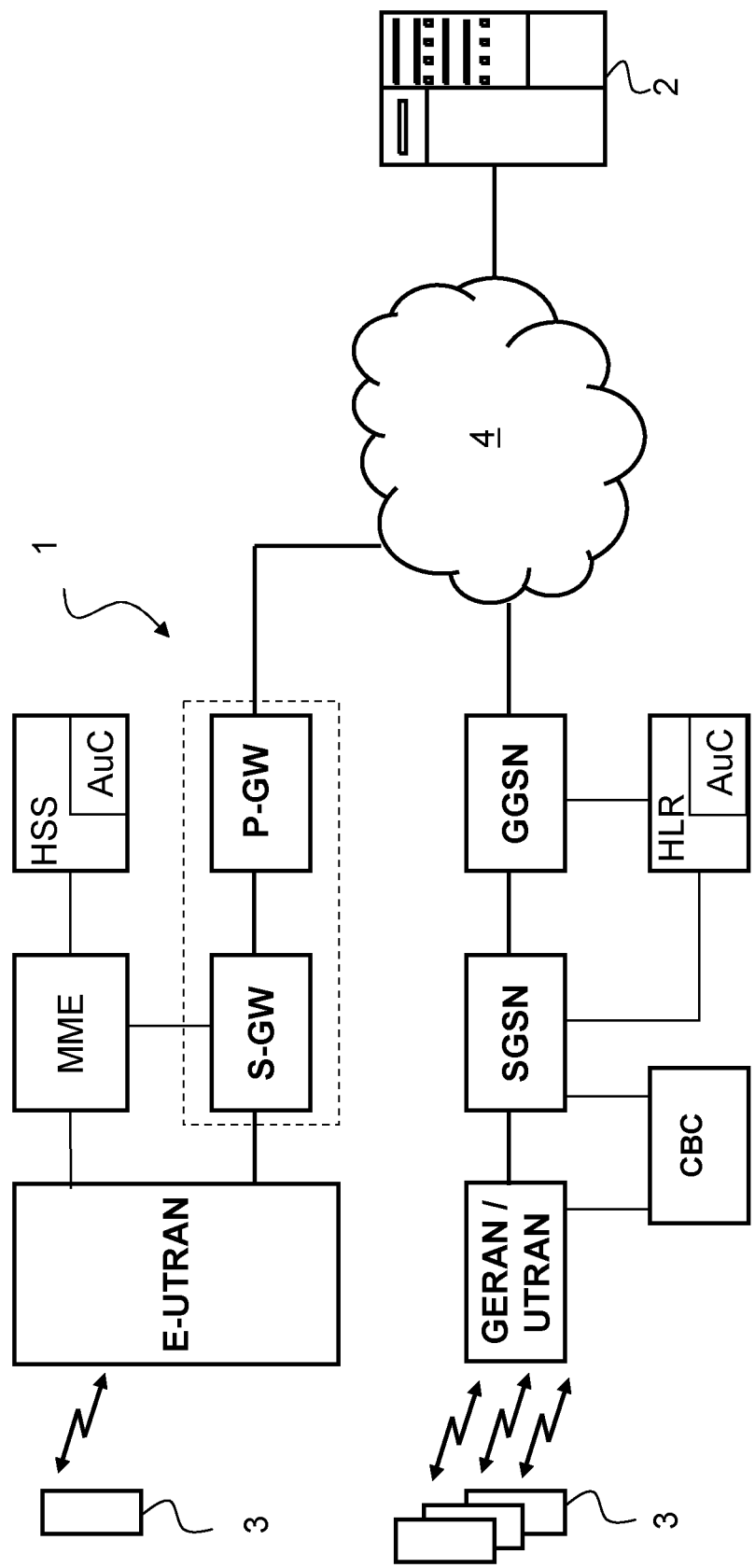
FIG. 3 is a schematic illustration of a telecommunications network connecting communication devices to an application server for M2M communications.

FIG. 3 shows a schematic illustration of a telecommunications network 1. The telecommunications network 1 enables data sessions between an application server 2 and a communication device 3 over a data network 4, wherein access of the communication device 3 to the telecommunications network 1 is wireless.

In the telecommunications network of FIG. 1, three generations of telecommunications networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network comprising a GGSN, an SGSN and a Radio Access Network (GERAN or UTRAN). For a GSM/EDGE radio access network (GERAN), the access network comprises a Base Station Controller (BSC) connected to a plurality of Base Station Transceivers (BTSs), both not shown. For a UMTS radio access network (UTRAN), the access network comprises a Radio Network Controller (RNC) connected to a plurality of NodeBs), also not shown. The GGSN and the SGSN are conventionally connected to a Home Location Register (HLR) that contains subscription information of the requesting entities RE. In the figure, the HLR is combined with an authentication centre (AuC) for authenticating REs in the network. A cell broadcast centre CBC is available for broadcasting messages in one or more cells of the UTRAN.

The upper branch in FIG. 1 represents a next generation telecommunications network, commonly indicated as Long Term Evolution (LTE) or Evolved Packet System (EPS). Such a network comprises a PDN Gateway (P-GW) and a Serving Gateway (S-GW). The E-UTRAN of the EPS comprises evolved NodeBs (eNodeBs or eNBs) providing wireless access for a communication device 3 that is connected to the S-GW via a packet network. The S-GW is connected to a Home Subscriber Server HSS and a Mobility Management Entity MME for signalling purposes. The HSS includes a subscription profile repository and an authentication centre (AuC).

Further information of the general architecture of a EPS network can be found in 3GPP TS 23.401.

Figure 4:
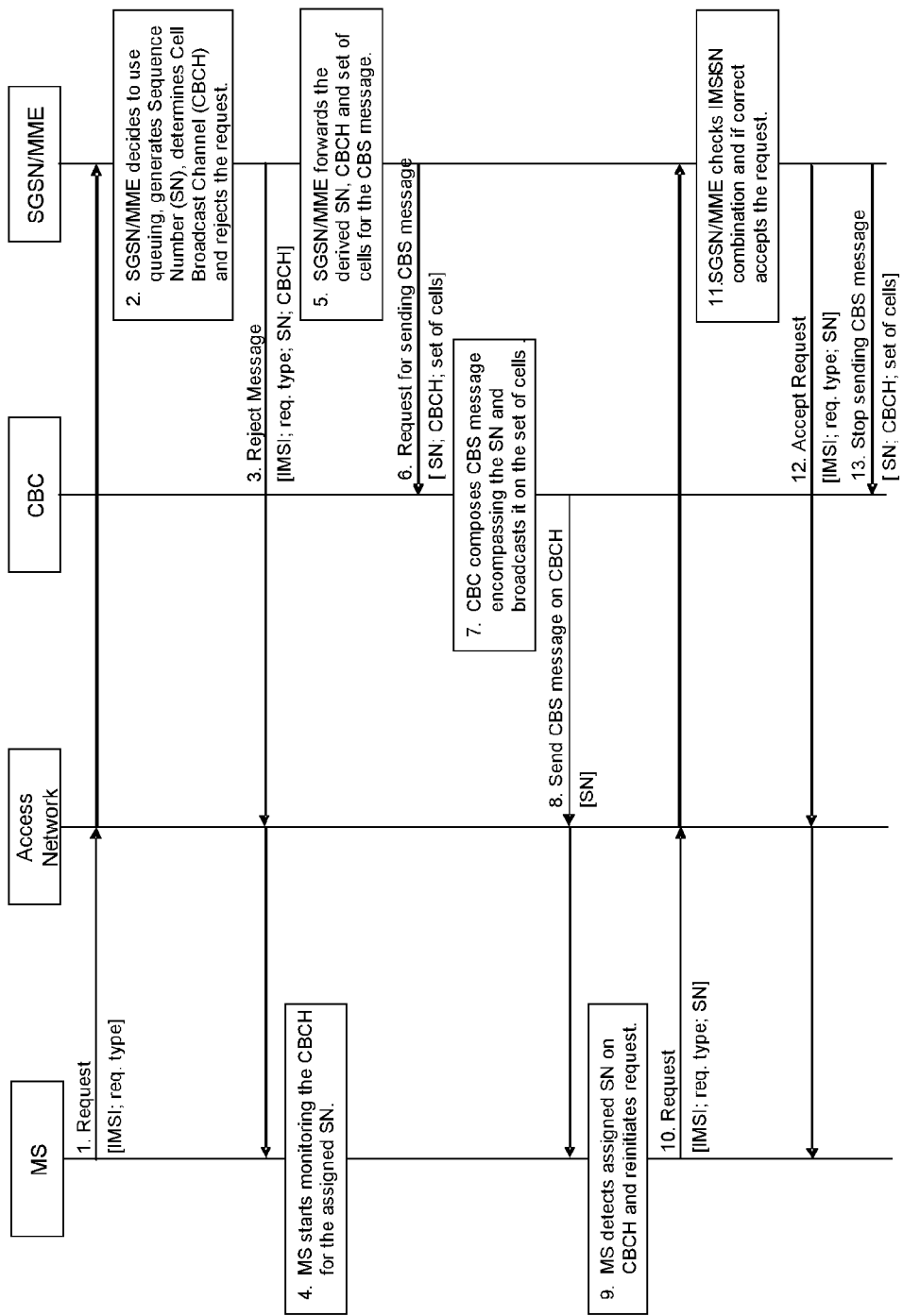
FIG. 4 is a schematic diagram illustrating steps for the operation of the telecommunications network of FIG. 3.
Figure 5:
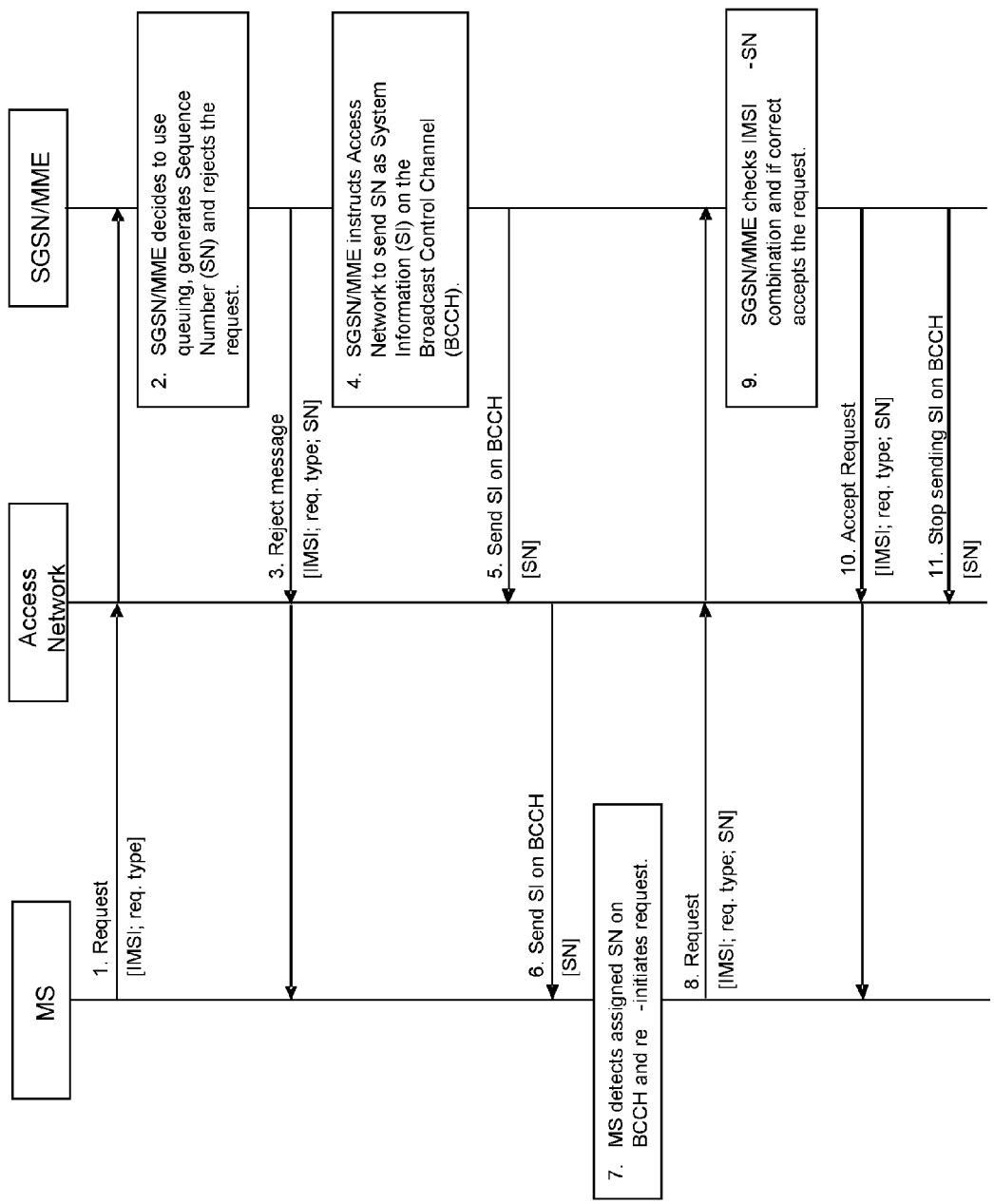
FIG. 5 is a schematic diagram illustrating steps for another example of operation of the telecommunications network of FIG. 3.

FIGS. 4 and 5 depict further time diagrams illustrating specific examples of the method in the system of FIG. 3 that was generally described above with reference to FIG. 2. In the examples, it is assumed that the SGSN or the MME is the serving entity and that a mobile station MS is the requesting entity.

In step 1 of FIG. 4, a MS generates a service request. The service may either contain an attach request to the network (e.g. IMSI attach and/or GPRS attach) or a call set up request (e.g. a PDP Context set up or voice call set up). Other types of service requests may also be possible e.g. a handover request, location update request, etc.

In step 2, when receiving the service request the SGSN/MME has to decide, e.g. based on available processing power, if it wants to use the request queuing mechanism described in general with reference to FIG. 2. If not, the SGSN/MME handles the service request in a normal way. Otherwise, the SGSN/MME generates a sequence identifier SI, e.g. a Sequence Number (SN), and determines a Cell Broadcast Channel CBCH for sending a Cell Broadcast Service (CBS) message on a the Access Network (AN).

In step 3, the SGSN/MME rejects the service request from the MS by sending a Reject message to the MS. This message contains the assigned SN and the CBCH on which the MS will receive the CBS message.

When receiving the Reject message, the MS starts monitoring on the received CBCH if a CBS message contains its assigned SN (step 4). As some later time, the SGSN/MME instructs the Cell Broadcast Center (CBC) about the CBS message to be send on the AN. Information that may be sent to the CBC includes, the the SN, the CBCH to be used to broadcast the CBS message, the set of cells to which the CBS message should be broadcasted, and timing information like start time and cease time of the CBS message (step 5).

In step 6, the SGSN/MME request the CBC to send a CBS message according to the settings determined by the SGSN/MME is performed. The CBC composes the CBS message containing the SN and starts sending the CBS message according to the instructions from the SGSN/MME (steps 7 and 8). CBS messages are broadcasted via the AN to all MSs which have activated the CBCH.

In step 9, the MS detects a SN in a CBS message assigned in a Reject message and re-initiates a service request message in step 10. The second service request send by the MS contains the IMSI, the request type and the SN assigned.

In step 11, the SGSN/MME receiving the information in the second service request performs checks on this information in order to avoid misuse of the SN by other MSs (IMSI-SN combination). Also a check may be needed to avoid that the same MS is using the SN for a different request type (request type-SN combination).

In step 12, when all checks are positive, The SGSN/MME, executes the request and sends an Accept Request message to the MS. The SGSN/MME instructs the CBC to stop sending the CBS message (step 13).

The time diagram in FIG. 5 is different for the diagram in FIG. 4 in the manner of communicating the sequence identifier to the requesting entities.

In step 1, the MS generates a service request message. The service request message may again either contain an attach request to the network (e.g. IMSI attach and/or GPRS attach) or a call set up request (e.g. a PDP Context set up or voice call set up). Other types of requests may also be possible e.g. a handover request, location update request, etc.

In step 2, when receiving a service request, the SGSN/MME has to decide, e.g. based on available processing power, if it wants to use its request queuing mechanism. If not, the SGSN/MME handles the Request in a normal way. Otherwise, the SGSN/MME generates a sequence identifier, e.g. a Sequence Number (SN), which will be send as System Information on the Broadcast Control Channel (BCCH) by the Access Network (AN), e.g. using a base station controller BSC, an RNC etc.

In step 3, the SGSN/MME rejects the service request from the MS by sending a reject message to the MS. This message contains the assigned SN. When receiving the reject message the MS starts monitoring if the assigned SN is contained in the system information on the BCCH.

At some later point in time, the SGSN/MME has to instruct the AN about the SN to be send as system information on the BCCH of the AN (steps 4 and 5). The AN starts sending the SN as part of the system information on the BCCH of the AN (step 6).

The MS detects the assigned SN in the system information on the BCCH and re-initiates a service request message (steps 7 and 8). The second service request contains the IMSI, the request type and the assigned SN.

In step 9, the SGSN/MME receiving the information in the second service request message performs checks on this information in order to avoid misuse of the SN by other MSs (IMSI-SN combination). Also a check may be needed to avoid that the same MS is using the SN for a different request type (request type-SN combination).

In step 10, when all checks are positive, the SGSN/MME executes the second service request and sends an Accept Request message to the MS. The SGSN/MME instructs the AN to stop sending the SN as system in the BCCH (step 11).

In the described method, it should preferably be avoided that requesting entities can use sequence identifiers assigned to other entities. In the examples of FIGS. 4 and 5, the serving entity SGSN/MMS uses the identity of the MS (e.g. the IMSI, MSISDN or IMEI) that is linked to the sequence identifier by the serving entity. Other approaches can be used in additional or as an alternative, including the use of tokens and/or encryption techniques. As an example, a serving entity may assign and send not only a sequence identifier but also a token (e.g. a randomly generated number) linked to the sequence identifier to the requesting entity. The token is stored in the serving entity and verified once the second service request (also containing the sequence number token) is received. The serving entity may also generate an encrypted sequence identifier according to a suitable algorithm that allows the serving entity to check the validity of the encrypted sequence identifier used by the RE.

For the examples of FIGS. 4 and 5, inn case the token and/or encryption method is used, the reject message (step 3) and the second service request (step 10 in FIG. 4; step 8 in FIG. 5) may contain the token or the encrypted SN as a parameter.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semi-conductor memory) on which information is permanently stored; and (ii) writable storage media (e.g., floppy disks within a diskette drive or hard-disk drive or any type of solid-state random-access semiconductor memory, flash memory) on which alterable information is stored.

The invention claimed is:

1. A method for handling a service request from a requesting entity in a telecommunications network, said method comprising:
    receiving, from said requesting entity, a first service request requesting a particular service from a serving entity;
    assigning a sequence identifier to said requesting entity from which said first service request is received;
    rejecting said first service request by sending a reject message to said requesting entity;
    informing said requesting entity of said sequence identifier;
    transmitting said sequence identifier in said telecommunications network to said requesting entity after informing said requesting entity of said sequence identifier;
    receiving a second service request for said particular service from said requesting entity in response to transmitting said sequence identifier in said telecommunications network; and
    allowing said second service request from said requesting entity for said particular service.

2. The method according to claim 1, further comprising:
    detecting congestion in said telecommunications network; and
    assigning said sequence identifier and rejecting said first service request in response to detecting congestion in said telecommunications network.

3. The method according to claim 1, wherein said assigned sequence identifier is included in said reject message.

4. The method according to claim 1, wherein transmitting said sequence identifier comprises broadcasting said sequence identifier in said telecommunications network.

5. The method according to claim 1, further comprising:
    receiving said sequence identifier in said second service request; and
    verifying whether said sequence identifier corresponds to said requesting entity.

6. The method according to claim 1, further comprising linking said sequence identifier to at least one of said requesting entity or said particular service.

7. The method according to claim 1, further comprising:
    starting a timer after informing said requesting entity of said sequence identifier; and
    transmitting at least one further sequence identifier assigned to a further requesting entity after expiry of said timer.

8. The method according to claim 1, further comprising:
    defining a plurality of queues, each queue comprising one or more requesting entities; and
    assigning said sequence identifier of said requesting entity to one of said plurality of queues.

9. The method according to claim 1, further comprising:
    transmitting a plurality or range of sequence identifiers assigned to a plurality of requesting entities in said telecommunications network;
    receiving one or more second service requests for said particular service from at least one of said plurality of requesting entities; and
    allowing said one or more second service requests from said at least one of said plurality of requesting entities for said particular service.

10. The method according to claim 1, further comprising communicating sequence information of said requesting entity from a previous serving entity to a next serving entity.

11. A system for handling a service request in a telecommunications network, said system comprising:
    a serving GPRS support node (SGSN), wherein the SGSN is configured to:
        receive, from a requesting entity, a first service request requesting a particular service from said SGSN;
        assign a sequence identifier to said requesting entity from which said first service request is received;
        reject said first service request by sending a reject message to said requesting entity;
        inform said requesting entity of said assigned sequence identifier;

transmit said sequence identifier in said telecommunications network to said requesting entity after informing said requesting entity of said assigned sequence identifier;

receive a second service request for said particular service from said requesting entity in response to transmitting said sequence identifier in said telecommunications network; and allow said second service request from said requesting entity for said particular service.

12. A method for requesting a service from a service entity in a telecommunications network, said method comprising:

transmitting a first service request to said telecommunications network for a particular service;

receiving a reject message in response to transmitting said first service request;

receiving and storing a sequence identifier;

receiving, after storing said sequence identifier, said sequence identifier;

transmitting a second service request to said telecommunications network; and using said particular service triggered by said second service request.

13. The method according to claim 12, wherein said assigned sequence identifier is included in said reject message.

14. The method according to claim 12, wherein receiving, after storing said sequence identifier, said sequence identifier comprises receiving said sequence identifier on a broadcast channel in said telecommunications network.

15. The method according to claim 12, further comprising transmitting said assigned sequence identifier in said second service request.

16. The method according to claim 12, further comprising:

detecting a change regarding requesting services from a previous serving entity to a next serving entity, wherein said sequence identifier relates to said previous serving entity;

disregarding said sequence identifier and transmitting said first service request to said next serving entity; and receiving and storing a new sequence identifier assigned by said next serving entity.

17. A system for requesting a service to a serving entity in a telecommunications network, said system comprising:

a mobile station, wherein the mobile station is configured to:

transmit a first service request to said telecommunications network for a particular service;

receive a reject message in response to transmitting said first service request;

receive and store a sequence identifier;

receive, after storing said sequence identifier, said sequence identifier;

transmit a second service request to said telecommunications network; and use said particular service triggered by said second service request.

18. The system according to claim 17, wherein said mobile station is further configured to facilitate linking said sequence identifier to at least one of said mobile station and said particular service in said telecommunications network.

19. A system for requesting a service to a serving entity in a telecommunications network, said system comprising:

a network element, wherein the network element is configured to:

transmit a first service request to said telecommunications network for a particular service;

receive a reject message in response to transmitting said first service request;

receive and store a sequence identifier;

receive, after storing said sequence identifier, said sequence identifier;

transmit a second service request to said telecommunications network; and use said particular service triggered by said second service request.

20. The system of claim 19, wherein the network element is selected from the group consisting of a base station, an (e)NodeB, a remote network controller (RNC), a serving General Packet Radio Service (GPRS) support node (SGSN), and a mobility management entity (MME).

21. A system for handling a service request in a telecommunications network, said system comprising:

a network element, wherein the network element is configured to:

receive, from a requesting entity, a first service request requesting a particular service from said network element;

assign a sequence identifier to said requesting entity from which said first service request is received;

reject said first service request by sending a reject message to said requesting entity;

inform said requesting entity of said assigned sequence identifier;

transmit said sequence identifier in said telecommunications network to said requesting entity after informing said requesting entity of said assigned sequence identifier;

receive a second service request for said particular service from said requesting entity in response to transmitting said sequence identifier in said telecommunications network; and allow said second service request from said requesting entity for said particular service.

22. The system of claim 21, wherein the network element is selected from the group consisting of a serving General Packet Radio Service (GPRS) support node (SGSN) and a mobility management entity (MME).

* * * * *